(12) United States Patent
McAllister et al.

(10) Patent No.: US 7,623,531 B2
(45) Date of Patent: Nov. 24, 2009

(54) NEGOTIATION OF DATAPATH TREATMENT FOR END-TO-END INTERWORKED NETWORK TRAFFIC

(75) Inventors: Shawn McAllister, Manotick (CA); Mustapha Aissaoui, Kanata (CA)

(73) Assignee: Alcatel Lucent, Paris (FR)

( * ) Notice: Subject to any disclaimer, the term of this patent is extended or adjusted under 35 U.S.C. 154(b) by 526 days.

(21) Appl. No.: 11/108,733

(22) Filed: Apr. 19, 2005

(65) Prior Publication Data

US 2006/0233167 A1 Oct. 19, 2006

(51) Int. Cl.
*H04L 12/28* (2006.01)
(52) U.S. Cl. ..................................... 370/401
(58) Field of Classification Search ................ 370/231, 370/254, 395.2, 229, 236, 468, 401, 466
See application file for complete search history.

(56) References Cited

U.S. PATENT DOCUMENTS

| | | | |
|---|---|---|---|
| 6,633,571 B1 * | 10/2003 | Sakamoto et al. | 370/401 |
| 6,671,367 B1 * | 12/2003 | Graf et al. | 379/229 |
| 2002/0136223 A1 * | 9/2002 | Ho | 370/395.51 |
| 2003/0112760 A1 * | 6/2003 | Puppa et al. | 370/241.1 |
| 2004/0008706 A1 * | 1/2004 | Sakamoto et al. | 370/401 |
| 2005/0286558 A1 * | 12/2005 | Ould-Brahim et al. | 370/467 |
| 2006/0146832 A1 * | 7/2006 | Rampal et al. | 370/395.5 |
| 2007/0008982 A1 * | 1/2007 | Voit et al. | 370/401 |
| 2007/0280267 A1 * | 12/2007 | Ould-Brahim | 370/395.53 |
| 2007/0286090 A1 * | 12/2007 | Rusmisel et al. | 370/252 |

OTHER PUBLICATIONS (Luca Martini, et al.), "Pseudowire Setup and Maintenance using LDP", vol. pwe3, No. 16, Mar. 2005, XP015038839, pp. 1-33.
(Florin Balus, et al.), "Multi-hop Pseudowire Setup and Maintenance using LDP", pp. 1-15, Feb. 2005, XP015037603.
(George Swallow Cisco Sytems et al.), "Soft Permanent Virtual Circuit Interworking between PWE3 and ATM", Feb. 2005, pp. 1-17, XP015039749, No. 2.
"Broadband integrated services digital network (B-ISDN)-Digital Subscriber Signalling System No. 2 (DSS 2).," International Telecommunication Union, Dec. 2003, XP017402773.

(Continued)

*Primary Examiner*—Kwang B Yao
*Assistant Examiner*—Kenan Cehic
(74) *Attorney, Agent, or Firm*—Kramer & Amado, P.C.

(57) ABSTRACT

Various embodiments are a method for negotiating datapath treatment for traffic sourced from a first communications network over an end-to-end path in respect of a path segment provided for the traffic in a second communications network, the path segment being requested for a first node of the second communications network and being targeted to a second node of the second communications node. The method comprises: for the first node, notifying that a datapath capability for the path segment is one for selection for the second node; communicating datapath capabilities associated with the first node; selecting, for the second node, a datapath capability from the datapath capabilities so communicated; communicating the datapath capability so selected for the second node back to the first node; and wherein the path segment is established using a signaling protocol of the second communications network. Various embodiments are also be implemented in a corresponding communications node.

18 Claims, 2 Drawing Sheets

OTHER PUBLICATIONS

"Technical Report TRQ.2830: ATM-MPLS network i nterworking signalling requirements", International Telecommunication Union, Sep. 2003, XP017403288.

ATM Forum Technical Committee, ATM-MPLS Network Interworking, Signalling Specification Version 1.0, Aug. 2003.

Swallow, G., et al., Soft Permanent Virtual Circuit Interworking Between PWE3 and ATM, Network Working Group, Cisco Systems, Jul. 2004.

* cited by examiner

NEGOTIATION OF DATAPATH TREATMENT FOR END-TO-END INTERWORKED NETWORK TRAFFIC

FIELD OF THE INVENTION

The present invention relates generally to the field of networked communications and more particularly, to a method for the negotiation of datapath treatment for end-to-end traffic traversing communications networks having differing network protocols. By way of example, the method as aforesaid may be performed between a source or first customer facing edge node of a downstream network and a target or second customer facing edge node of the same network.

BACKGROUND OF THE INVENTION

It has been known in the field of networked communications to deploy virtual connections such as Soft Permanent Virtual Connections (SPVCs) to provision end-to-end communications in Asynchronous Transfer Mode (ATM) networks and in Frame Relay (FR) networks. As known to those in this art, SPVCs are characterized in that they can be configured from edge network nodes to which customer equipment or other access circuits may be connected. Also, virtual connections such as SPVCs allow for communications that can be re-routed automatically in the event of a datapath failure. With the advent and increasing adoption of Internet Protocol suite (IP) networks, mechanisms have been devised to permit the end-to-end establishment of traffic flows or connections originating from ATM compliant networks or other networks over IP backbone networks. For instance, ATM pseudowires (PWs) in Multiprotocol Label Switching (MPLS) networks have been employed to route, signal and forward ATM originated traffic end-to-end over such networks.

Thus, ATM Forum document af-cs-0197.000 entitled "ATM-MPLS Network Interworking Signalling Specification Version 1.0" and dated August 2003, teaches the tunneling of ATM routing and signaling information via the MPLS protocol. The latter teaching uses ATM as the signaling protocol to establish a logical ATM pipe or pseudowire type in an MPLS backbone network. This document makes provision for the negotiation of an encapsulation mode for the forwarded traffic. As known to those in this art, an encapsulation mode defines a means for carrying one protocol packet inside another packet of a differing protocol. The carried packet retains its original packet header information and format unchanged. However, the document does not provide support for the selection of datapath interworking, e.g. FRF.5 and FRF.8.1 FR-ATM interworking, since the architecture in question is dedicated and preconfigured for given end systems or access circuits that are ATM compliant. By datapath interworking, those skilled in this art will understand that the packet format of an originating network environment will be translated or adapted into another packet format according to the protocol of the transiting network, based on knowledge of the higher layer payload carried inside the packet. In other words, the architecture taught in the foregoing document is not described as applying to networks where technologies other than ATM are used at the access circuit endpoints. Finally, the reference in question makes use of the ATM signaling protocol to set up the pseudowire and not an MPLS signaling protocol such as LDP.

As known to those skilled in the art of networked communications, a draft document of the Internet Engineering Task Force (IETF), namely the Network Working Group Internet Draft entitled "Soft Permanent Virtual Circuit Interworking between PWE3 and ATM" which is dated July 2004 and is authored by G. Swallow and M. Spiegel (draft-swallow-pew3-spvc-iw-01.txt, hereafter the "SPVC Interworking Draft" which is hereby incorporated by reference herein), proposed an interworking methodology between Private Network Node Interface (PNNI) SPVC signaling and the Label Distribution Protocol (LDP) as extended by various other IETF drafts. These other IETF drafts, also known to those in this art, are entitled "Pseudowire Setup and Maintenance using LDP" which is dated December 2004 and is authored by L. Martini and E. Rosen (draft-ietf-pew3-control-protocol-14.txt) and "Provisioning Models and Endpoint Identifiers in L2VPN Signalling" which is dated September 2004 and is authored by E. Rosen and V. Radoaca (draft-ietf-l2vpn-signaling-02.txt), and these drafts are also incorporated by reference herein. However, the foregoing prior art does not provide a mechanism whereby an MPLS/IP interface edge node of an MPLS network can in every case determine or infer, solely from the contents of an ATM connection setup message, the type of encapsulation to use on the pseudowire over the MPLS network. Likewise, the interface node in question according to the teachings of the prior art cannot in every case determine or infer what type of datapath interworking to adopt, if any, solely from the contents of the ATM connection setup message. Moreover, the foregoing prior art does not specify or make reference to any procedures for datapath interworking being performed at an MPLS/IP interface edge node of an MPLS network.

The present invention attempts to address or alleviate some or all of the foregoing issues by providing a method for the establishment, on a per-circuit, per-call or per-connection basis, of the datapath treatment of a traffic interconnect sourced with a first network and carried over a second network.

SUMMARY OF THE INVENTION

According to a broad aspect of the present invention, there is provided a method for negotiating datapath treatment for traffic sourced from a first communications network over an end-to-end path in respect of a path segment provided for said traffic in a second communications network, the path segment being requested for a first node of the second communications network and being targeted to a second node of the second communications node, the method comprising: for the first node, notifying that a datapath capability for the path segment is one for selection for the second node; communicating datapath capabilities associated with the first node; selecting, for the second node, a datapath capability from the datapath capabilities so communicated; communicating the datapath capability so selected for the second node back to the first node; and wherein the path segment is established using a signaling protocol of the second communications network.

BRIEF DESCRIPTION OF DRAWINGS

For purposes of illustration, but not of limitation, embodiments of the invention will next be described with reference to the following drawings, in which.

DETAILED DESCRIPTION OF ILLUSTRATIVE EMBODIMENTS

Figure 1:
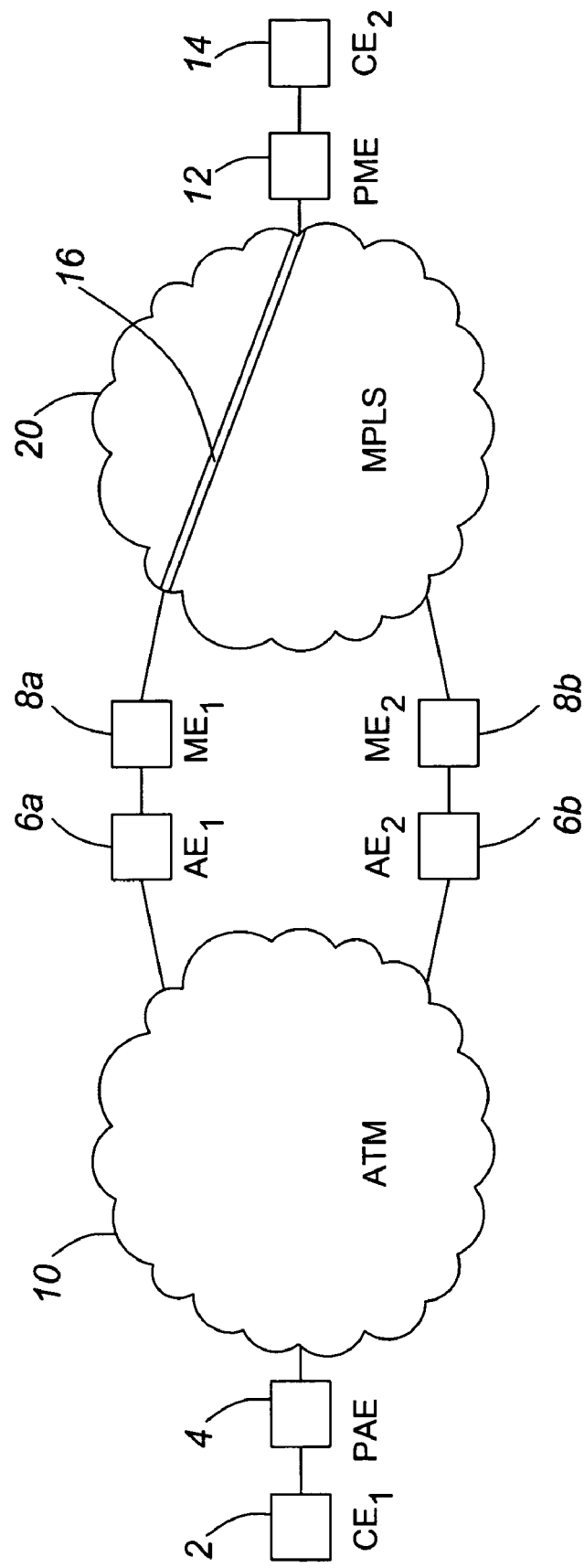
FIG. 1 is an exemplary network architecture in which an embodiment of the present invention may be deployed.

With reference to FIG. 1, there is shown an exemplary network architecture having two networks with differing network protocols, for instance an ATM network 10 and an MPLS/IP or other packed switched network 20. A first customer edge device 2 ("CE$_1$") may be connected via an ATM source edge node 4, for instance a provider or customer facing ATM edge node ("PAE"), to the ATM network 10. One or more edge nodes 6a and 6b of the ATM network 10, for instance interfacing or gateway nodes ("AE$_1$" and "AE$_2$"), may be connected to one or more corresponding edge nodes 8a and 8b ("ME$_1$" and "ME$_2$") of the MPLS/IP network 20. The edge nodes 6a, 6b and 8a, 8b are operatively connected through protocols well known to those in this art, for instance by way of ATM Inter-Network Interface (AINI), ATM Forum or ITU-T User Network Interface (UNI), or PNNI compliant interfaces. An MPLS/IP target edge node 12, for instance a customer facing MPLS/IP edge node ("PME"), connects the MPLS/IP network 20 to another customer edge device 14 ("CE$_2$"). The first and second customer edge devices 2 and 14, together with their associated source edge node 4 and target edge node 12, form part of respective access circuits (ACs) of the network architecture.

As mentioned previously, it is known in the art to forward traffic sourced with a first customer edge device 2 and associated with an ATM network 10 through an MPLS/IP network 20 and on to a second customer edge device 14. As taught in the SPVC Interworking Draft, an end-to-end traffic path or connection between the edge devices 2 and 14 is accomplished through the segment of the MPLS/IP network 20 by means of a pseudowire 16, the latter in the case of an MPLS network being a bidirectional MPLS path established using LDP signaling. The pseudowire is established over an IP/MPLS tunnel referred to as a Packet Switched Network (PSN) tunnel. The SPVC Interworking Draft provides for a scheme of encapsulation mode choice or selection by the interface nodes 8a or 8b of the MPLS/IP network 20 which is based on the contents of an ATM SETUP message received from gateway nodes "AE$_1$" or "AE$_2$". The SPVC Interworking Draft does not support or specify the ability to perform datapath interworking functions at such interface nodes 8a or 8b.

As to the scheme for encapsulation mode choice in the SPVC Interworking Draft, Sections 6.5.2 and 6.6 thereof discuss how an interface node 8a or 8b chooses an ATM encapsulation mode according to known encapsulation standards based on the content of an ATM SETUP message. The SPVC Interworking Draft proposes utilizing AAL5 SDU frame mode encapsulation when the destination Access Circuit is Frame Relay compliant, and one of the known cell mode encapsulations when the destination Access Circuit is ATM compliant, with N:1 encapsulation being the preferred mode in the latter instances. However, those skilled in this art will appreciate that whether the destination Access Circuit is Frame Relay or ATM compliant cannot always be detected solely based on ATM signaling and even in cases where the remote Access Circuit is signaled according to ATM standards, it may in any event be desirable to use an SDU encapsulation mode.

As acknowledged in Section 6.6 of the SPVC Interworking Draft, the DLCI format of the SPVC Information Elements (IEs) is not supported by all ATM compliant equipment. Some such equipment supports the signaling of an SPVC to a Frame Relay destination Access Circuit, but with a VPI/VCI in the SPVC IE. Therefore, it is not always possible to know to select an ATM SDU encapsulation mode in such instances. Also, according to the PNNI network protocol, when a called party number identifies an interface that is not a cell relay or frame relay interface, the VCI is a virtual identifier whose semantics are local to, and defined within the context of, the called party number. In such cases, this VCI field is not an actual VCI. Thus, according to the prior art teachings as aforesaid, if the destination Access Circuit were to be an Ethernet port for example, then a VPCI/VCI would be signaled by way of the SPVC IEs and one would not be able to detect solely from the SPVC IE the more favorable use of ATM SDU encapsulation for such a call.

As mentioned earlier, even in instances where the destination Access Circuit is indeed an ATM circuit, it may nevertheless be desirable in some cases to use ATM SDU encapsulation rather than any cell mode encapsulation for sake of efficiency. Again, there is no reliable method according to the prior art to detect such instances solely based upon the format or content of the applicable SPVC IE. While it may perhaps be possible in some instances to detect that an SPVC is carrying AAL5 traffic by examining IEs indicating the AAL type (for instance the ATM adaptation parameters IE) or by an examination of the Frame Discard indication, this methodology will not universally ensure a correct identification of the encapsulation mode for progressing a call over a succeeding network. By way of example, according to the PNNI protocol, AAL parameters for information elements are not included in a CALL SETUP message, and therefore the foregoing technique is not likely to be feasible for PNNI compliant traffic. The method according to an embodiment of the present invention as described below provides for a technique of negotiating on a per-circuit, per call or per connection basis what mode of encapsulation or datapath interworking the edge interface node 8a or 8b is to perform.

Section 4.1 of the SPVC Interworking Draft discusses Frame Relay to ATM interworking being performed at the MPLS/IP target edge node 12, and not at an interface edge node 8a or 8b of the MPLS/IP network 20. While this may be acceptable in some networks, it would also be desirable to be capable of locating the interworking function at the interface edge nodes 8a or 8b according to an embodiment of the present invention as described below.

Figure 2:
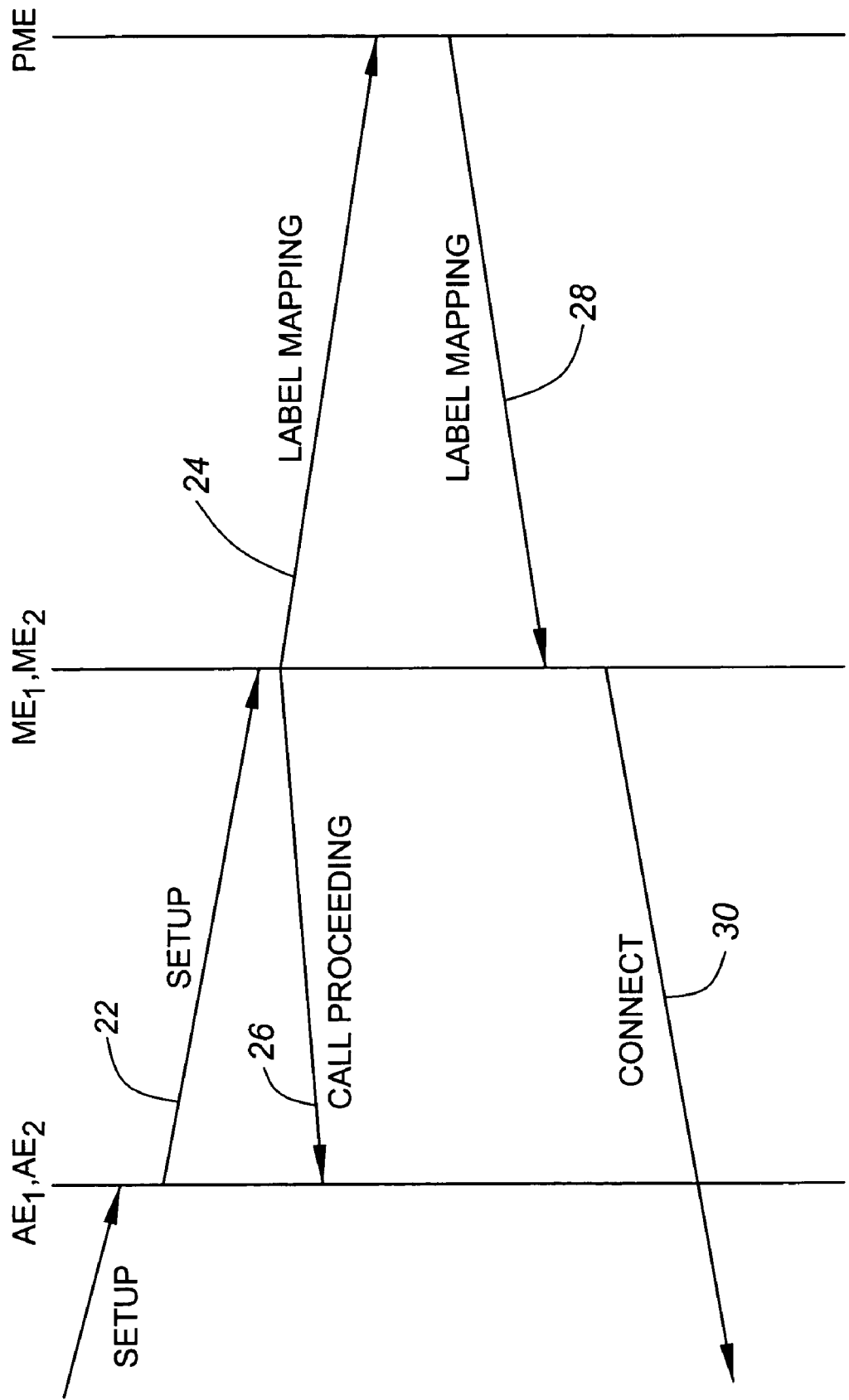
FIG. 2 is a signaling flow sequence diagram which illustrates the operation of the method according to an embodiment of the present invention.

According to an embodiment of the method according to the present invention, and with reference to FIG. 2, a call or connection request is received from an Access Circuit by means, for instance by way of a Call setup message 22 or the like forwarded from a gateway or interface node 6a or 6b to an MPLS/IP interface edge node 8a or 8b. Following receipt of the Call setup message 22, the node 8a or 8b forwards or otherwise advertises a list of datapath capabilities, such as encapsulations, that the interface node 8a or 8b is capable of supporting on the pseudowire or other traffic path that is sought to be established over the MPLS/IP network 20. For instance, this list may be contained in a Label Mapping message 24 addressed to the MPLS/IP target edge node 12. Also, the interface edge node 8a or 8b may also advertise the datapath interworking type that it is capable of supporting. The interface edge node 8a or 8b may also forward a call proceeding message 26 or the like, in order to notify the gateway or interface node 6a or 6b that the requested call or connection is in progress.

The target edge node 12 uses the capabilities advertised as aforesaid by the interface node 8a or 8b, along with the local configuration for the target attachment circuit and its own capabilities, in order to select an encapsulation mode and a datapath interworking type, if the latter is advertised, from the list forwarded by the interface node 8a or 8b for the circuit, call or connection in question. The result of this negotiation is returned to the interface node 8a or 8b, for instance via a return Label Mapping message 28 forwarded by the target edge node 12 to the interface node 8a or 8b so as to establish the opposite direction of the call or connection. Once the interface node 8a or 8b receives from the target edge node 12 the Label Mapping message 28 for the particular circuit, call or connection in question, the node 8a or 8b utilizes the negotiated encapsulation mode and datapath interworking type, if applicable, for the datapath of the said circuit, call or connection. Having received the Label Mapping message 28 as aforesaid, the interface node 8a or 8b may forward a connect message 30 or the like to the gateway or interface node 6a, and onwards to the source network node 4 of the source Access Circuit. Thus, by way of example, if the target access circuit connected to the target edge node 12 operates according to the a Frame Relay protocol, then the target edge node 12 can request that the interface node 8a or 8b set up a FR pseudowire and perform FRF8.2 interworking, or it can instead request that the interface node 8a or 8b set up an ATM SDU pseudowire, with FRF8.2 interworking being performed at the target edge node 12.

The advertised and negotiated encapsulation mode and datapath interworking type may be exchanged between the interface node 8a or 8b and the target edge node 12 by way of the known Interface Parameters Type Length Value (TLV). First, a new value of the PW Type field of the Generalized ID FEC element may be utilized in order to signify from the interface node 8a or 8b to the target edge node 12 that the encapsulation mode will be negotiated. The new value as aforesaid may be utilized to trigger the negotiation procedures between the interface node 8a or 8b and the target edge node 12. As currently known in the art, the PW Type field identifies the encapsulation mode of a particular pseudowire. This field, combined with the Attachment Group Identifier (AGI) and Attachment Individual Identifier (AII), uniquely identifies an instance of a pseudowire and therefore cannot be modified without teardown of the pseudowire. Thus, by identifying the encapsulation mode as "Negotiated" according to an embodiment of the present invention in a new value of the PW Type field of the Generalized ID FEC element, interface node 8a or 8b does not need to change the PW type to match the result of the negotiation with the target node 12.

In addition to the new PW Type value as aforesaid for indicating that the actual encapsulation for the pseudowire is to be negotiated between an interface node 8a or 8b and the target edge node 12, two additional interface parameters may be utilized to implement an embodiment of the method of the present invention. One of these interface parameters may be used to advertise the encapsulation mode capabilities, and optionally the datapath interworking type capabilities, of the interface node 8a or 8b. The other of these interface parameters may denote the negotiated or agreed datapath treatment to be applied to the pseudowire 16. These two new interface parameters may be rendered as TLVs, as shown in Table 1 below.

The PW Type value for notifying that a datapath treatment for a pseudowire 16 is to be negotiated, and the interface parameters for advertising particular datapath capabilities and for denoting a negotiated datapath treatment, may for instance take the format and values set out in Table 1 below.

TABLE 1

PW Type Value and Interface Parameter Values for Datapath Treatment Negotiation

| PW Type Value | | Description |
|---|---|---|
| 0x0020 | | Negotiated |

| Interface Parameters | Length | Description |
|---|---|---|
| 0x0a | 4 | PW Type Capabilities Advertisement |
| 0x0b | 4 | Agreed PW Type |

| PW Capabilities and Agreed PW Type Values | Description |
|---|---|
| 0x00000001 | Frame Relay DLCI with FRF8.1 translation mode |
| 0x00000002 | Frame Relay DLCI with FRF8.1 transparent mode |
| 0x00000004 | Frame Relay DLCI with FRF.5 interworking |
| 0x00000008 | ATM AAL5 SDU VCC transport |
| 0x00000010 | ATM n-to-one VCC cell transport |
| 0x00000020 | ATM n-to-one VCC cell mode |
| 0x00000040 | ATM one-to-one VCC cell mode |
| 0x00000080 | ATM one-to-one VPC cell mode |
| 0x00000100 | ATM AAL5 PDU VCC transport |
| 0x00000200 | Ethernet tagged mode |
| 0x00000400 | Ethernet |

The foregoing listing of Table 1 is not exhaustive as to its PW capabilities and agreed PW Type values. In addition to the foregoing values, other relevant parameters that are associated with the encapsulation modes and datapath interworking types set out above may also be included as required or desired. For instance, it may be desirable to specify the maximum number of concatenated ATM cells for an SDU formatted encapsulation. While both encapsulation mode and datapath interworking type have been specified in the examples of Table 1, those skilled in this art will understand that it may be feasible in some network architectures, or for some circuits, connections or calls, not to specify datapath interworking types but only encapsulation. For instance, an interface node 8a or 8b may be preconfigured to assume a particular datapath interworking type, or a given network architecture may have datapath interworking preconfigured at the target edge node 12.

When a call, connection or other traffic path establishment message is received by an interface edge node 8a or 8b, for instance a CALL SETUP message such as an SPVC SETUP message launched or propagated by an interface edge node 6a or 6b, the Called Party number IE will contain an IP-embedded NSAP address, as known to those skilled in this art. The SPVC IE is converted by the interface edge node 8a or 8b to a Label Mapping message, for instance in the form of a Generalized ID FEC element containing the "Negotiated" value as described above in Table 1. The node 8a or 8b searches for an appropriate outgoing IP/MPLS tunnel to the target edge node 12, over which the pseudowire packets will be forwarded if pseudowire 16 is successfully established according to the procedures in this section. If one is found, a call proceeding message 26 as known to those in this art may be returned to the node 6a or 6b, and a Label Mapping message 24 is forwarded to the target edge node 12. The interface edge node 8a or 8b also includes in its Label Mapping message 24 a PW Type parameter according to the format described above in Table 1 that serves to advertise the encapsulation or datapath interworking capabilities the node 8a or 8b is capable of performing over the pseudowire in question. A timer may also be started as known in this art to ensure a finite wait period for call completion. If no appropriate outgoing IP/MPLS tunnel is found, the node 8a or 8b sends a RELEASE COMPLETE or other like known message to the node 6a or 6b with either a Crankback IE (in the case of an AINI interface) or with appropriate CAUSE IE values (in the case of a UNI interface).

When the Label Mapping message 24 arrives at the target edge node 12, based on the presence of the value "Negotiated" in the PW Type, the target edge node 12 will examine the received encapsulation modes and datapath interworking types as advertised in the interface parameter which provides a list of datapath capabilities that the interface edge node 8a or 8b is capable of performing. The target edge node 12 selects one of the advertised datapath capabilities from those set out in the said interface parameter, based for instance on information configured for the local Access Circuit in question and the local datapath capabilities of the target edge node 12. If none of the advertised datapath capabilities is acceptable, then a Label Release message as known to those in this art may be dispatched to the interface node 8a or 8b. Otherwise, a Label Mapping message 28 is forwarded to the interface node 8a or 8b, also having the PW Type value of "Negotiated" as previously described, and further containing an interface parameter which provides a value for the selected or negotiated datapath treatment that is to be performed by the interface node 8a or 8b. The foregoing value will also be as previously described in Table 1. The receipt of the Label Mapping message 28 by the interface node 8a or 8b completes the bidirectional datapath for the pseudowire 16, thereby completing the connection or call.

Those skilled in this art will understand that the foregoing description relates to embodiments of the present invention that are illustrative and not limiting of same. Accordingly, it will be appreciated by the skilled person in this art that various modifications of detail may be made to the present invention, all coming within its spirit and scope.

We claim:

1. A method for negotiating datapath treatment for traffic sourced from a first communications network over an end-to-end path in respect of a path segment provided for said traffic in a second communications network, the path segment being requested for a first edge node of the second communications network and being targeted to a second edge node of the second communications network, the method comprising:

the first edge node notifying the second edge node that a datapath capability for the path segment is one for selection for the second edge node, wherein the datapath capability includes a datapath interworking capability identifying a plurality of different Asynchronous Transfer Mode (ATM)-Multi-Protocol Label Switching (MPLS) datapath interworking types supported by the first edge node, each of said interworking types having an associated network tunnel type through the second communications network, and the datapath interworking capability includes at least one data encapsulation mode supported by the first edge node;

said first edge node communicating said datapath capability supported by the first edge node from the first edge node to the second edge node;

the second edge node selecting a datapath interworking type and an encapsulation mode from the communicated datapath capability;

the second edge node communicating the datapath interworking type and an encapsulation mode so selected by sending a return request message for establishment of the path segment back to the first edge node;

establishing the path segment through a network tunnel of the second communications network in accordance with the network tunnel type associated with the selected datapath interworking type.

2. The method of claim 1, wherein the notifying and communicating are made by means of a request for establishment of the path segment.

3. The method of claim 2, wherein the request for establishment of the path segment contains a list of datapath capabilities of the first edge node of the second communications network.

4. The method of claim 3, wherein said selecting a interworking type and encapsulation mode from the datapath capabilities so communicated is performed at the said second edge node of the second communications network.

5. The method of claim 4, wherein the datapath capability so selected is communicated by means of a message transmitted from the said second edge node of the second communications network to the first edge node thereof.

6. The method of claim 5, wherein the message is a return request for establishment of the path segment.

7. The method of claim 6 wherein a datapath capability includes at least one pseudowire type supported by the first edge node and the path segment is a pseudowire of a type in accordance with the pseudowire type of the selected datapath interworking type.

8. The method of claim 7, wherein the second communication network operates according to an MPLS protocol.

9. The method of claim 8, wherein the request for establishment of the path segment is a Label Mapping message.

10. The method of claim 9, wherein the Label Mapping message contains said notifying to the second edge node of the second communications network to indicate that the datapath capability for the path segment is one for selection for the said second edge node.

11. The method of claim 10, wherein the notifying is indicated in the Label Mapping message by a pseudowire (PW) Type field of a Generalized ID Forwarding Equivalence Class (FEC) element.

12. The method of claim 11, wherein the list of the said datapath capabilities is indicated in the Label Mapping message by an interface parameter of the message.

13. The method of claim 12, wherein the return request for establishment of the path segment is a Label Mapping message.

14. The method of claim 13, wherein the interworking type and encapsulation mode so selected is indicated in the return request for establishment of the path segment by an interface parameter of the message.

15. The method of claim 14, wherein the first edge node and second edge node of the second communications network are respectively an interface edge node and a target edge node thereof.

16. The method of claim 1, wherein the datapath interworking type capability includes information that determines which one from among the first edge node and the second edge node performs an ATM-to-frame interworking in accordance with the selected datapath interworking type.

17. The method of claim 1, wherein the datapath interworking type capability for selection by the second edge node includes at least one Frame Relay Date Link Connection Identifier (DLCI) with FRF8.1 type and at least one ATM to Virtual Continuous Channel (VCC) type.

18. The method of claim 1, wherein the second edge node selecting a datapath interworking type and an encapsulation mode from the communicated datapath capability includes the second edge node determining if it does not support the datapath interworking types and the encapsulation modes, and in response to said determining, communicating an indication of said determining to the first edge node.

* * * * *

UNITED STATES PATENT AND TRADEMARK OFFICE
CERTIFICATE OF CORRECTION

PATENT NO. : 7,623,531 B2  Page 1 of 1
APPLICATION NO. : 11/108733
DATED : November 24, 2009
INVENTOR(S) : McAllister et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 730 days.

Signed and Sealed this

Fourteenth Day of December, 2010

David J. Kappos
*Director of the United States Patent and Trademark Office*